United States Patent [19]

Tomikawa et al.

[11] 4,440,499

[45] Apr. 3, 1984

[54] METHOD AND APPARATUS OF BLOWING MORTAR OR THE LIKE

[75] Inventors: Kouichi Tomikawa, Kanagawa; Hiroshi Takahashi, Gunma, both of Japan

[73] Assignee: Engineering Resources Development Office, Tokyo, Japan

[21] Appl. No.: 241,458

[22] Filed: Mar. 3, 1981

[30] Foreign Application Priority Data

May 3, 1980 [JP] Japan .................................. 55-27750

[51] Int. Cl.³ ............................................... B28C 5/06
[52] U.S. Cl. ............................................ 366/3; 366/10
[58] Field of Search .................... 366/2, 3, 5, 6, 8, 10, 366/11, 13, 14, 15, 16, 17, 20, 30, 33, 34, 37, 40, 52, 151, 152, 154, 160, 161, 191

[56] References Cited

U.S. PATENT DOCUMENTS

| 2,231,489 | 2/1941 | Anderson et al. | 366/11 |
| 2,392,408 | 1/1946 | Radonich | 366/3 X |
| 3,300,193 | 1/1967 | Badgett | 366/8 |
| 3,672,646 | 6/1972 | Burtin | 366/13 |
| 4,293,227 | 10/1981 | Tanaka et al. | 366/11 |

FOREIGN PATENT DOCUMENTS

| 1148727 | 5/1963 | Fed. Rep. of Germany | 366/11 |
| 608905 | 5/1978 | U.S.S.R. | 366/11 |

Primary Examiner—Stephen Marcus
Assistant Examiner—Joseph M. Pitko
Attorney, Agent, or Firm—Michael J. Striker

[57] ABSTRACT

A new method and an apparatus concern improvements of blowing mortar or concrete on the feeding compression air, in which dry-mixed materials are quantitatively jetted from a nozzle at a blowing machine, and liquid is supplied by determined amount bearing on the compression air current through the nozzle, so that grains of the materials are mixed with the liquid while feeding the materials, and the property of such material is changed from dry condition to wet condition of determined water-cement ratio, and the thus changed material is jetted from a nozzle at the end of a hose.

7 Claims, 14 Drawing Figures

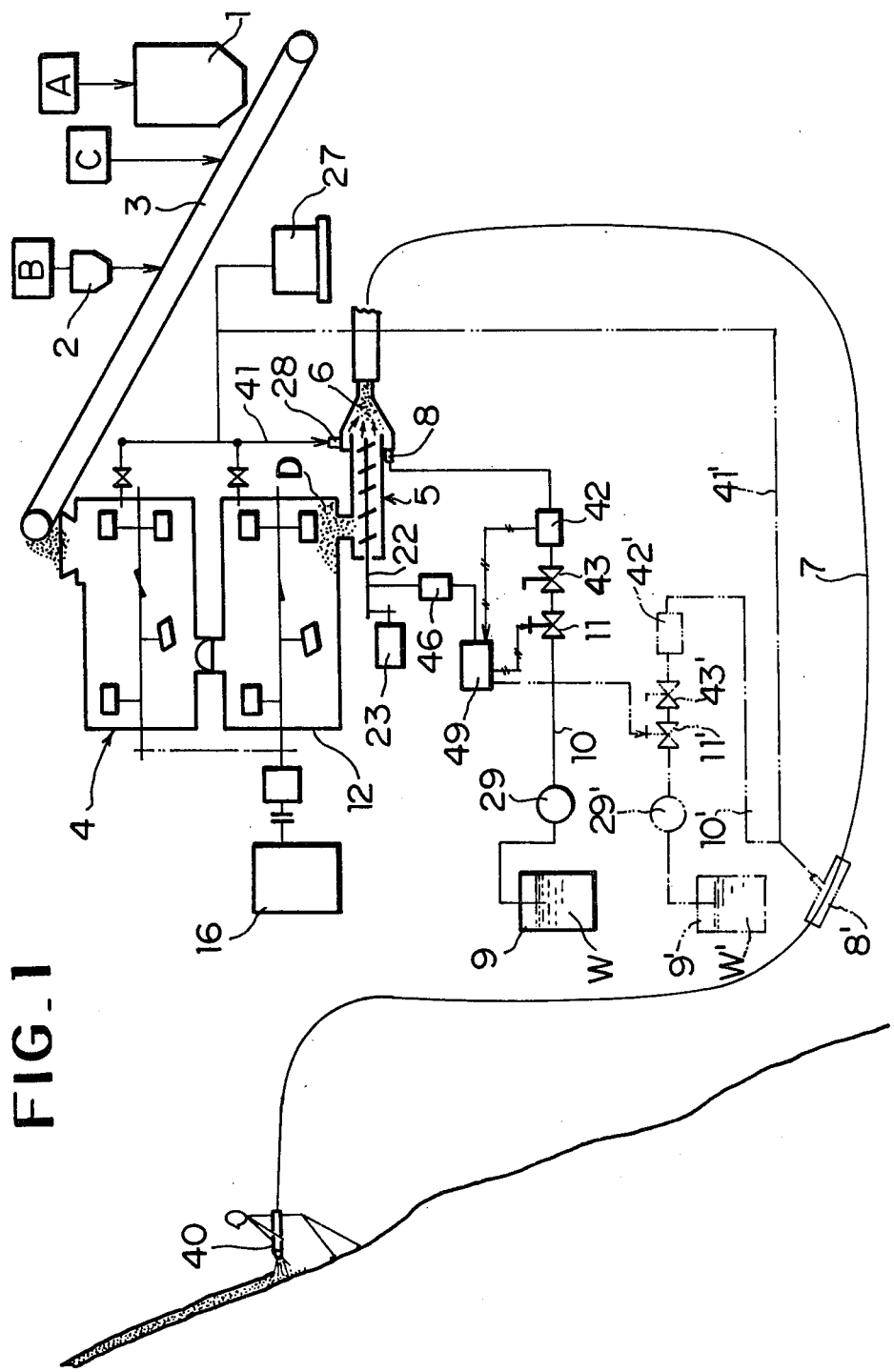
FIG_1

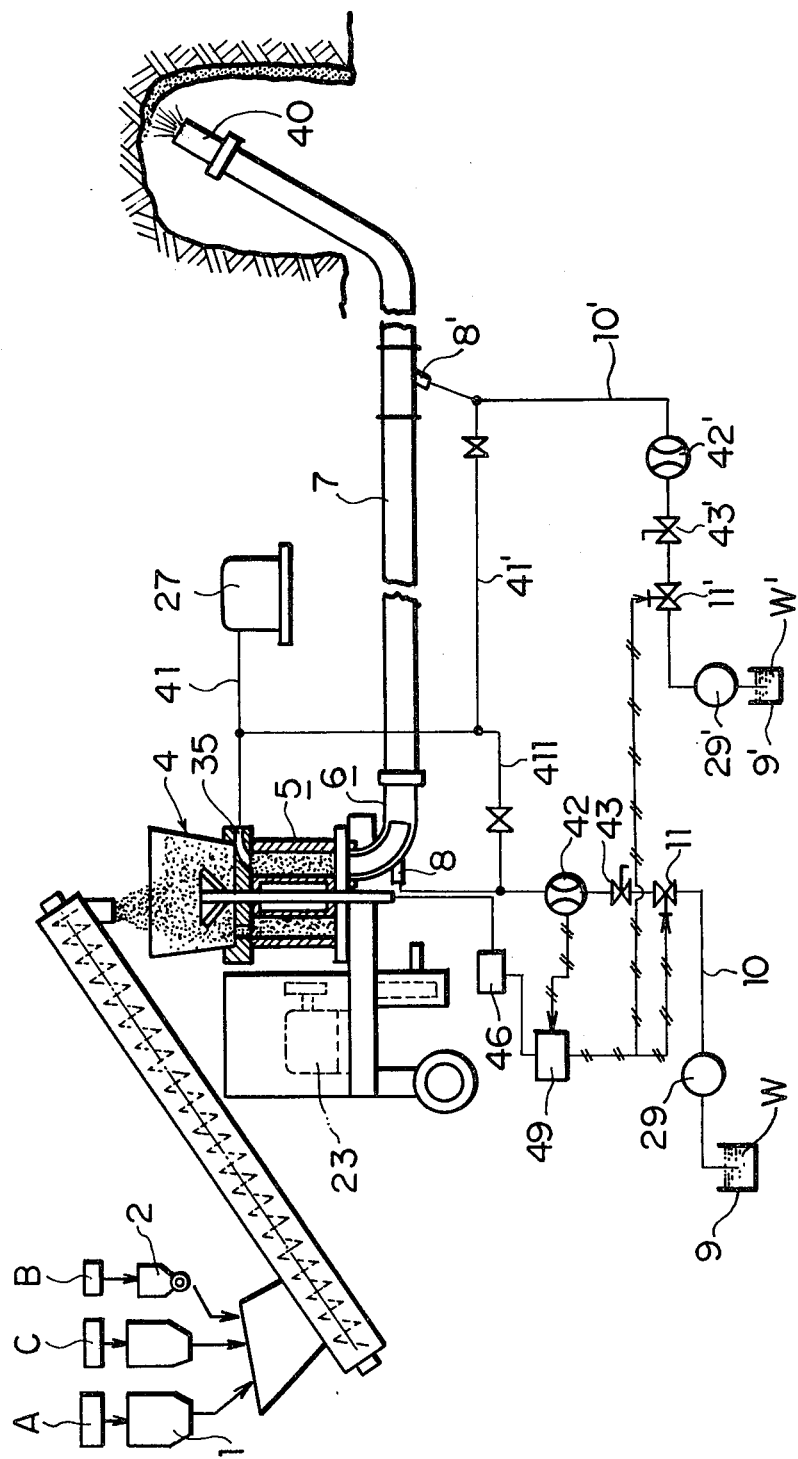
FIG_2

FIG_3
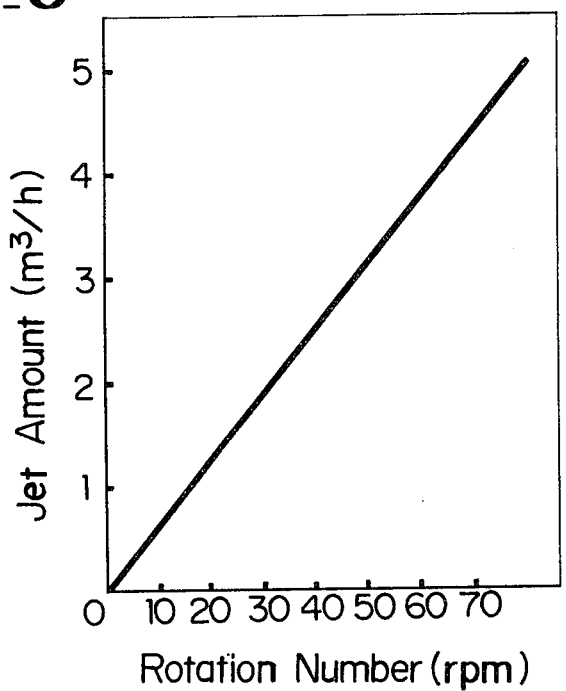
FIG_4
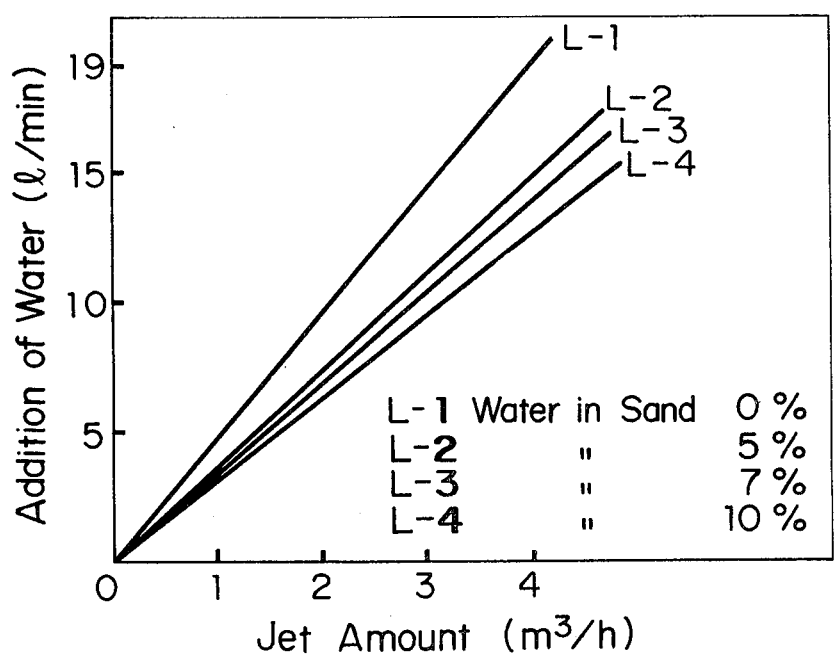

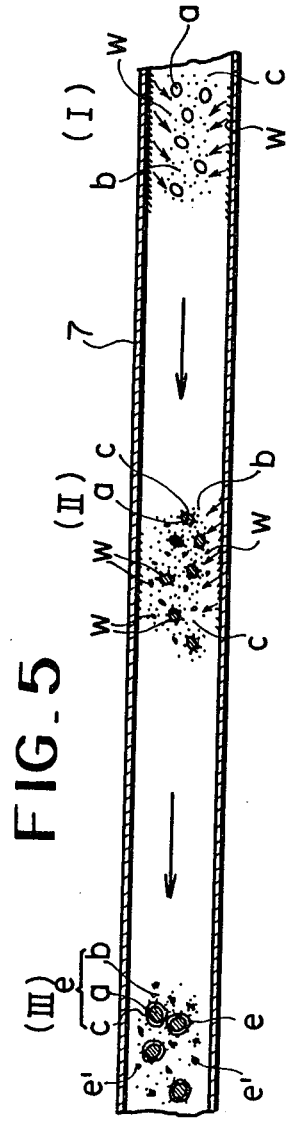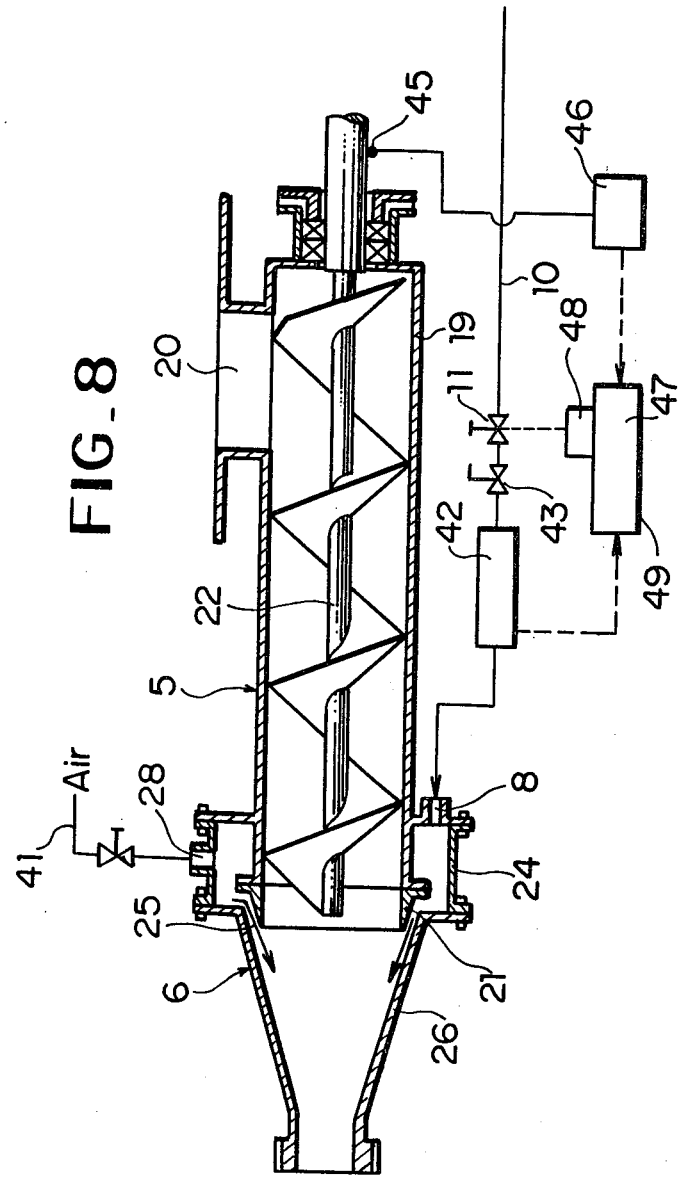

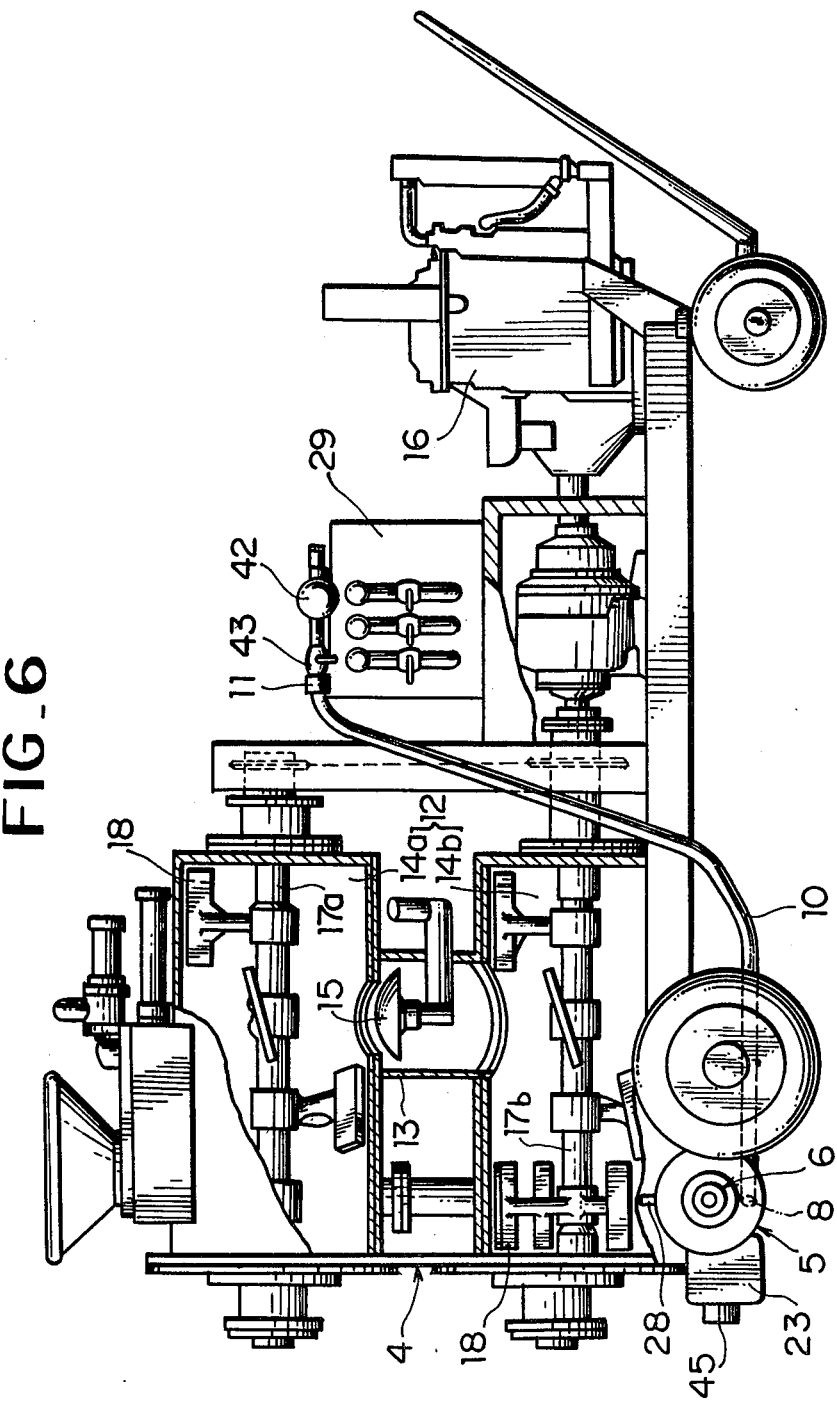
FIG_6

FIG_7
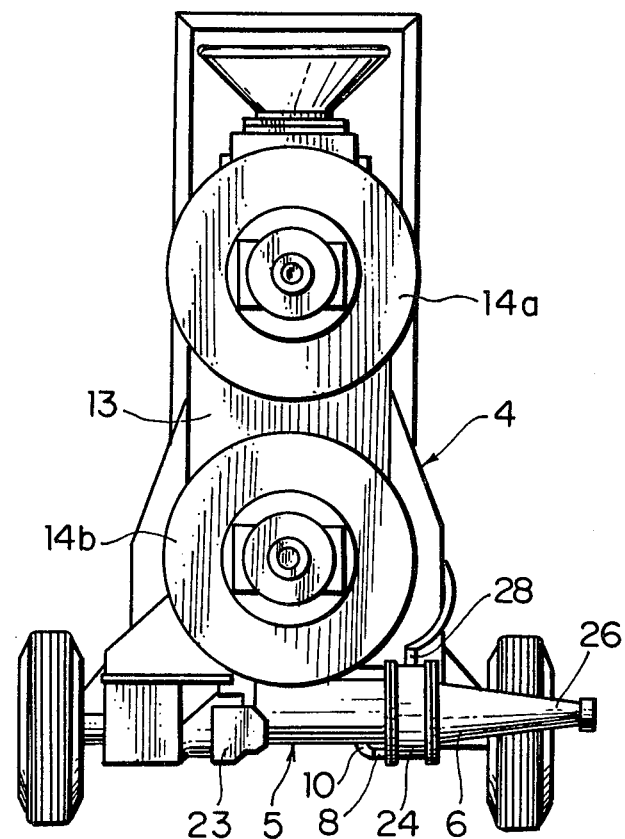

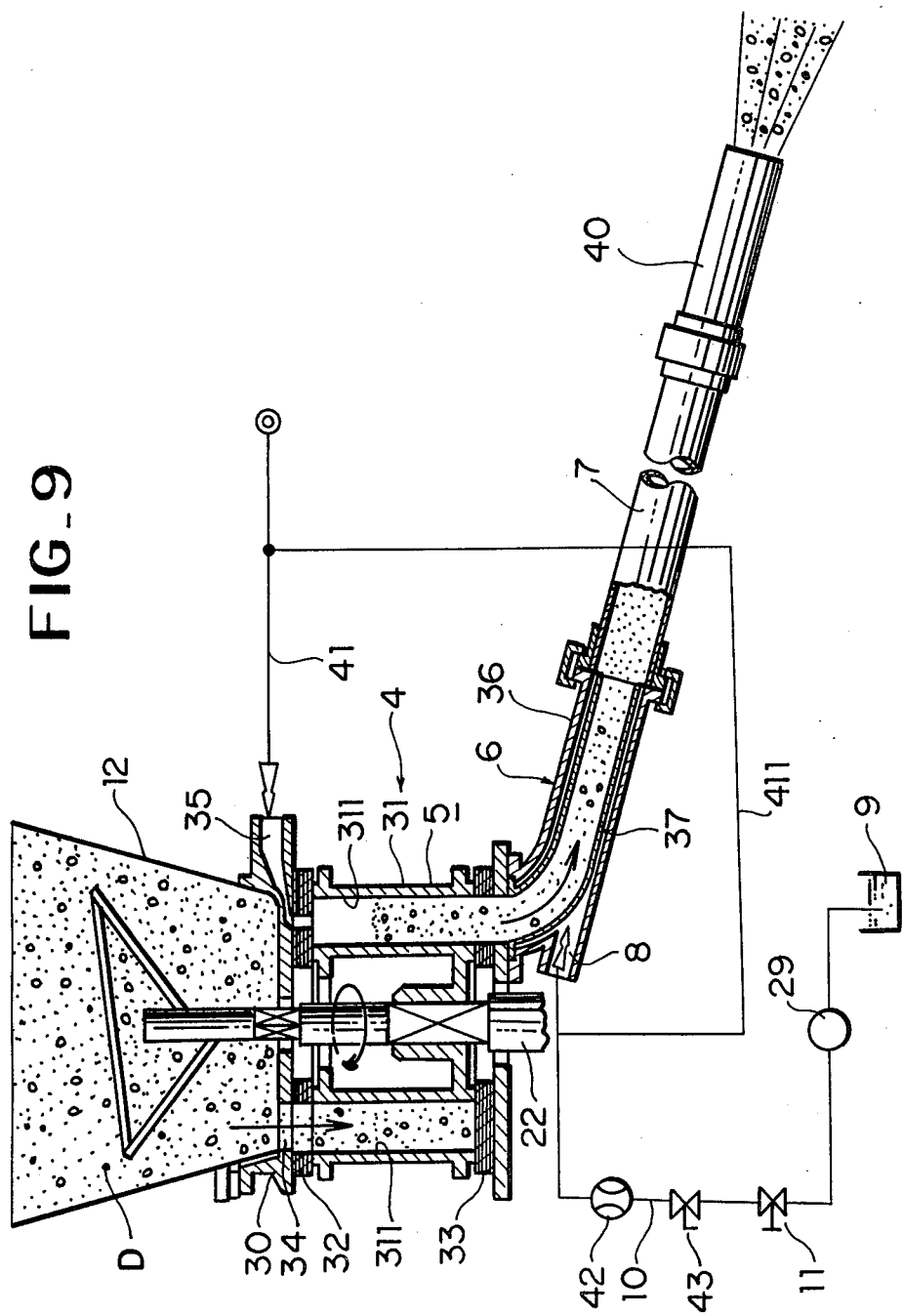
FIG_9

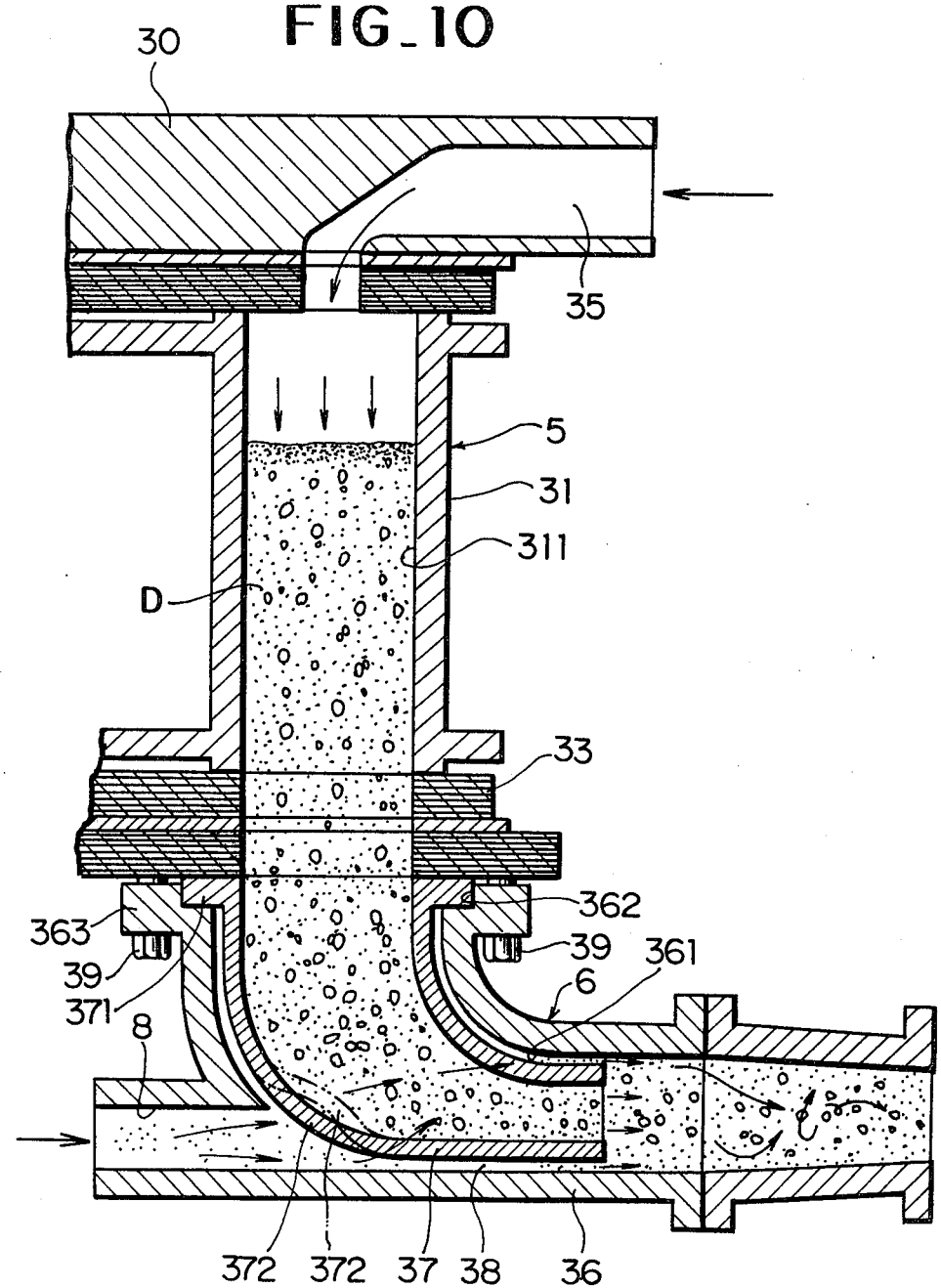

FIG_11
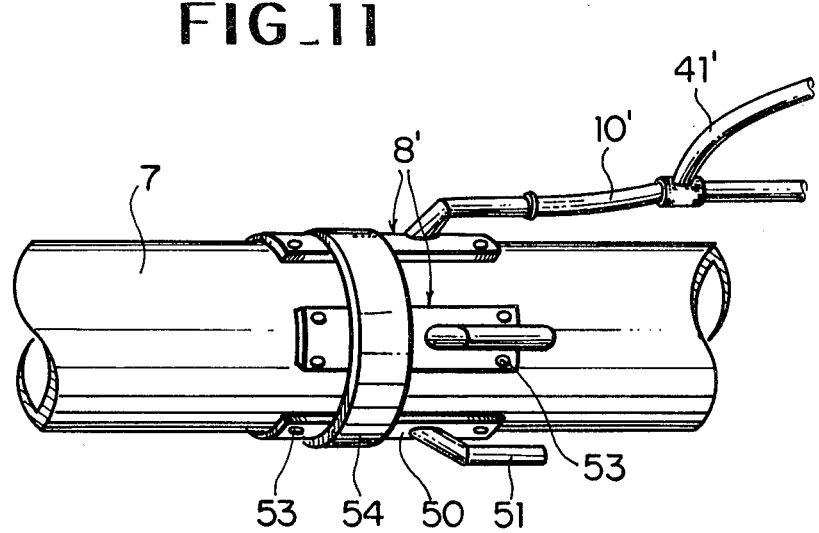
FIG_12
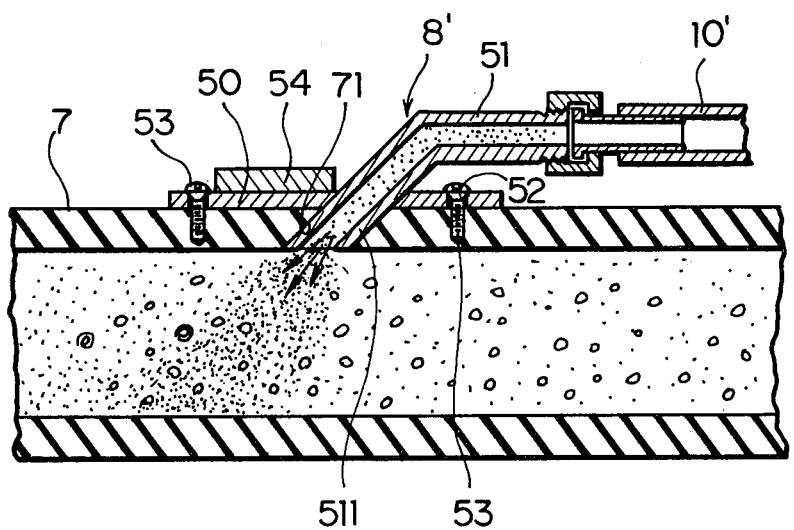

FIG_13
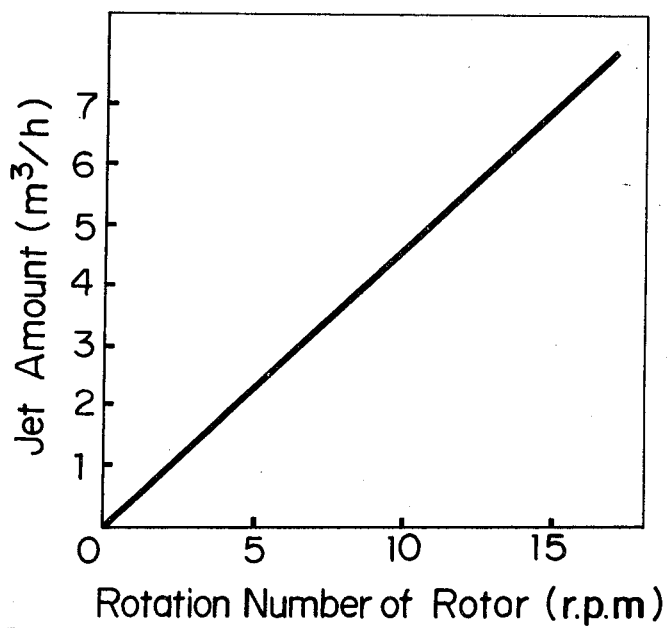
FIG_14
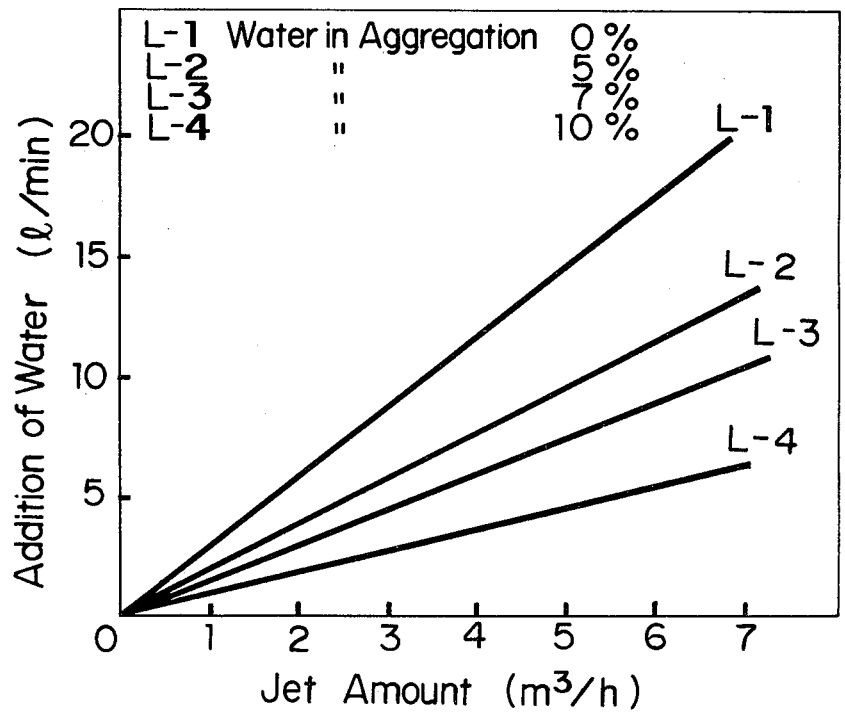

METHOD AND APPARATUS OF BLOWING MORTAR OR THE LIKE

BACKGROUND OF THE INVENTION

1. Field of the Invention

The invention relates to a method and an apparatus for blowing mortar or the like.

For practicing of lining tunnels, levels, slopes and others with mortar or concrete, a method of blowing the material by the feeding medium of the compression air is widely employed. This blowing method is divided into a dry blowing and a wet blowing.

The former comprises dry-mixing materials, such as aggregates, cement and others in a vessel, feeding on the compression air into a hose from a nozzle at a blowing machine, adding water nearly the blowing nozzle at the end of the hose or therearounds and blowing the material onto the object. The latter method comprises mixing aggregate and cement with the water in the vessel to prepare a wet mixture, feeding it into the hose from the machine side nozzle, and jetting it from the blowing nozzle.

Such blowing operation is required to provide high strength of product with little non-uniformity or dispersion, enable to feed the material under the pressure as long as possible or control splashing loss or occurrence of dusts. However, the conventional method could not satisfy all of those requirements.

2. Prior Art

The known dry blowing practice has a merit of making it possible to lengthen the feeding distance, since the dry mixed material is quantitatively jetted from a feed mechanism to the blowing nozzle by the compression air while maintaining the dry condition. However, in this operation water is added to the mixed material just before jetting from the blowing nozzle, and therefore mixing with water is insufficient. For this reason, more water is in general added to result in lowering strength of the lining layer owing to heightening the water-cement ratio and consequently to effect large non-uniformity in each of the lining layers. Further, because of much splashing loss or occurrence of dust, and since the material is jetted as reaction is immature even if accelerating agent were added, the effect by this addition could not be fully displayed and there occurs a problem of air pollution by the poisoneous nature of the accelerating agent.

On the other hand, in aforementioned wet blowing practice, the water is in advance added to the mixture of the aggregate and the cement in the vessel, so that the water-cement ratio is made constant in comparison with the dry blowing practice, and it is possible to provide the lining layer of the satisfactory strength with little splashing loss and occurrence of the dust. However, since the wet material of large specific gravity is fed under pressure, the feeding distance is limited accordingly and the blowing apparatus should be moved nearly to steep working place. Besides, the accelerating agent could not be used in this operation, since solidification progresses by reaction with the water during mixing in the vessel, and the mixture sticks to the interior of the vessel, the machine side nozzle or the hose. Thus, the operation becomes impossible soon. It is difficult to secure a sufficient strength at the beginning for lining on the tunnel arch or rapid slop. In the winter season, the method is disadvantageous since cracks caused by expansion of the water in the earth can not be avoided.

SUMMARY OF THE INVENTION

The present invention has been realized in view of the above mentioned circumstances. It is a primary object of the invention to provide a novel method in which the mixed material is fed long distance under pressure and is blown with little splashing loss and occurrence of dusts while maintaining the water-cement ratio low, and the lining layer of the high strength and little non-uniformity or dispersion is formed.

It is another object of the invention to provide a blowing method of mortar or concrete, which uniformly scatters into the mixed material a chemical admixture such as the accelerating agent or a water reducing admixture without clogging in the blowing machine or remaining as immature reaction, and blows the mixture under moderate condition of reacting advance, and which improves the strength at the tunnel ceiling.

It is a further object of the invention to provide a blowing method of mortar or concrete, which divisionally supplies water to the mixture at determined quantitative proportion between the machine side nozzle and the hose for feeding the mixture for a longer distance.

It is another object of the invention to provide a blowing apparatus which is most suited to the above mentioned operation, and continuously regulates the liquid at the proportional amount to the jetting amount of the dry mixture.

It is a further object of the invention to provide a blowing apparatus which quantitatively supplies the materials and continuously mixes them to turn out the dry mixed material, and feeds it on the compression air current while giving the water thereto at the determined amount, and jets a mixture of the desired water-cement ratio from the blowing nozzle.

It is another object of the invention to provide a blowing apparatus which exactly feeds the dry mixture at the determined amount without clogging in the machine side nozzle and uniformly scatters the liquid thereinto.

It is a still further object of the invention to provide a blowing apparatus which could easily avoid adherence of the mixed material within a transferring path by means of an easy structure.

For attaining these objects, the invention has converted the idea of the conventional blowing process which sent under pressure the mixture in the hose from the blowing machine while keeping the mixture in paste or dry mixed condition, and the invention in principle transforms in succession the property of the mixture from the dry condition to the wet condition during transferring from the blowing machine to the blowing nozzle.

In other words, in the process of feeding and blowing the mortar or concrete by the feeding compression air, this invention is characterized by dry-mixing the materials to be blown while feeding the material at the determined amount, and at the same time adding the liquid quantitatively together with the air at the machine side nozzle, contacting the liquid to grains of the materials in the course of sending in the hose in order to change the property of the mixture from the dry mixed condition to the wet mixed condition of the desired water/cement ratio, and jetting it out of the blowing nozzle to the object.

According to this method, it is possible to finely scatter the liquid by utilizing dynamic pressure of the compression air and effectively contact the liquid to the grains of the mixed material, and therefore the sending distance can be considerably lengthened in comparison with that case where the material and the liquid are mixed at the preceding stage of jetting from the machine side nozzle. In addition, if the accelerating agent or quick setting cement are used, those are uniformly scattered in the material and blown under the moderate condition of the reacting advance without sticking to the vessel housed in the blowing machine, and not blown as they are not fully reacted as often happens in the conventional dry process. The dry-mixed material is used and the water/cement ratio is controlled low. Further, since the present process uses the dry-mixed material while controlling the water/cement ratio low, and carries out blowing at the constant water/cement ratio per volume, it is possible to form the lining layer of the uniform and high strength.

Other than the above mentioned embodiment of supplying the liquid of the full amount, the invention also includes such an embodiment which supplies the liquid of the temporarily necessary amount via the machine side nozzle, and adds the remaining part at the intermediate part of the hose, and prepares the wet-mixed material of the finally destined water/cement ratio for blowing. In this practice, the change from the dry condition to the wet condition is moderate and the feed on the air is easy so that the distance can be more lengthened.

The present invention is also concerned with an apparatus for reducing the above mentioned operation to practice, which is basically characterized by providing the machine side nozzle to the blowing machine having a receptacle of the dry mixture and the feed mechanism, providing a liquid pouring port integral with or independent from a compression air feeding port to said machine nozzle, connecting the liquid pouring port to a liquid storage via a flowing control valve and a pump; and communicating the flowing control valve with the feeding mechanism through a control circuit for controlling the liquid supply amount in accordance with the material jetting amount from the machine side nozzle.

Herein, "dry-mixed material" means the mixture where the aggregate and cement, or the aggregate; cement and chemical admixture are dry-mixed without intentionally adding the water, and never mean that the aggregate should be completely dried. That is, this term does not exclude the water which naturally invades into the aggregate, but include the aggregate which is dried on its surface and saturated or the aggregate wet on the surface "Aggregate" includes fine aggregate such as sand, coarse aggregate such as ballast or crushed stone, or reinforcing fibers such as artificial aggregate or steel fiber.

"Chemical admixture" means by what is added, if necessary, as the component of the concrete or mortar, and includes the accelerating agent for accelerating solidification of the cement, the water reducing agent for smoothing fluidity of the material, retarder for retarding solidification. These chemical admixtures are, if being grains, added to the aggregate or the cement and compose the dry-mixed material, and compose, if being liquid, the composition of the above mentioned liquid. That is, "liquid" means the water or the liquid of the water being major portion, in other words, includes both the water only and the water soluble admixture.

BRIEF DESCRIPTION OF THE DRAWINGS

FIG. 1 is an explanatory view showing one example of blowing mortar or the like in accordance with the invention;

FIG. 2 is an explanatory view showing another example of the same;

FIG. 3 and FIG. 4 are graphs showing one example of controlling the amount of supplying the liquid in the invention;

FIG. 5 is a principle explanatory view showing changes of the properties of the dry-mixed materials;

FIG. 6 is a side view, partially in section, showing an apparatus for blowing mortor or the like;

FIG. 7 is a front view of the same;

FIG. 8 is a cross sectional view showing details of the machine side nozzle of the same;

FIG. 9 is a vertical side view showing another example of the same;

FIG. 10 is an enlarged cross sectional view of the machine side nozzle;

FIG. 11 is a side view showing one example of an intermediate liquid adding portion in the invention;

FIG. 12 is a side view, half in section, and

FIG. 13 and FIG. 14 are graphs showing other methods regulating the amount of supplying the liquid.

DETAILED DESCRIPTION OF THE INVENTION

The present invention will be explained with reference to the attached drawings.

FIG. 1 to FIG. 5 illustrate the blowing method of mortar or the like according to the invention. The aggregate (A) is measured on a gauge 1, and is preferably regulated within a determined range of less than 10% water and the cement (C) of the determined amount is added thereto, and those are uniformly dry-mixed by a mixer. If the chemical admixture (B), for example powder of the accelerating agent is used, it is measured on a gauge 2 and is mixed together with the aggregate (A) and the cement (C) by the mixer.

In the above mixing process, if the blowing machine 4 is provided with the mixer (FIG. 1), the aggregate (A), cement (C) and chemical admixture are fed on a conveyor 3 and thrown thereinto, and if the blowing machine is not provided with the mixing mechanism, those materials may be mixed by a cylindrical mixer or a batch mixer.

The thus obtained dry-mixed material (D) is passed through the blowing machine 4, the quantitative feed mechanism 5 such as a screw feeder (FIG. 1) or a feeder (FIG. 2), the machine side nozzle 6 continuous to the feed mechanism 5, and is jetted in the hose 7 by the compression air.

Thereby the dry mixture (D) of the determined compound is quantitatively transferred on the air one by one. At this time, this invention not only supplies the compression air to the machine side nozzle 6 but also concurrently pours the liquid (W) from the liquid pouring port 8 provided at the machine side nozzle 6. The pouring amount is appropriately varied in response to the amount of discharging the dry mixed material such that the initial water-cement ratio is, e.g., W/C=40%.

Actually, the pouring amount is set in relation to the rotation number of an output shaft of the feeding mechanism—the pouring amount—the water amount, as shown in FIG. 3 and a graph in FIG. 4 or graphs in FIG. 13 and FIG. 14, that is, by detecting the rotation number of the feeding mechanism (rotation number of a screw shaft or a rotor drive shaft in the present embodiment), obtaining the discharging amount of the dry-mixed material into the machine side nozzle 6 as shown in FIG. 3 or FIG. 13, applying the obtained discharging amount to lines of the water amount in FIG. 4 or FIG. 14 which is in advance calculated from an aimed water-cement ratio and the water containing rate of the aggregate and controlling, in response to the obtained water amount, an open angle of the flow control valve 11 coupled in a conduit 10 which connects the liquid pouring port 8 and the liquid storage 9. In the above mentioned graphs, FIG. 4 shows the case of mortar and FIG. 14 shows the case of concrete. The graph of the lines in response to the amount of the cement per 1 m$^3$ is prepared and an input is given to the control circuit.

When the liquid (W) of the determined amount is added to the dry mixture (D) together with the compression air, the dry mixture (D) is scattered into the compression air from the outlet of the machine side nozzle 6, and is fed on the air current in the hose. On the other side, the liquid (W) is partially sprayed and the remaining part thereof flows along an inside of the hose 7 from an interior of the nozzle. This condition continues for a while, and the liquid (W) is removed from the material by the compression air current and is sprayed as drops (w) of water into the hose. The water drops (w) begin the contact of grains (a) of the aggregate, grains (b) of the chemical admixture or powders (c) of the cement on float, and cause collision to the aggregate grains (a) delayed in flowing speed by the cement powders (c) and the chemical admixture grains (b) reacting with the water and increasing the specific gravity. While this feeding process further progresses, mixture around nuclei of the aggregate grain (a) takes place as shown in FIG. 5 (II) among the cement powder (c), the chemical admixture grain (b), the water drops (w) and the substances containing or absorbing the water, and such mixture is sent in so-called semi-mixed condition. The condition as mentioned above develops in proportion to further advancing of transferring. The wet material (e) around nuclei of the aggregate grain (a), and paste material (e′) of combination of the water solved cement grain (c) and the chemical admixture grain (b) are produced on the float (wet mixed condition). In such a manner, the mixed material is jetted from the blowing nozzle 40 under the condition of the desired water-cement ratio.

The above mentioned refers to the basic blowing practice according to the invention. It is desired to elongate the feeding distance, or heighten temporarily the water-cement ratio in condition of the working places, the method shown in FIG. 1 and FIG. 2 is recommended, i.e., the liquid-division-pouring method. This method pours the liquid at the machine side nozzle 6 together with the compression air, and again pours the liquid at the intermediate position of the hose 7 with the compression air. Then, in the former, the liquid of $\frac{1}{2}$ to $\frac{3}{4}$ of the full amount required to the blowing is supplied and in the latter the remaining part is added at the liquid adder 8′.

According to this method, the specific gravity can be reduced by the amount to be added at the intermediate position at 8′, and the material in the hose can be given the float force and the accelerating force by the compression air for feeding the remaining part of the liquid to be poured at the liquid adder 8′. At the same time, it is possible to make moderate changes the property from the dry-mixed condition to the wet-mixed condition. It is then recommended to supply as the liquid the water and the water soluble reducing agent in the liquid adder 8′.

The blowing apparatus for practicing the present invention is as shown in FIG. 6 to FIG. 12.

The instant apparatus has in general the receptacle 12 of the dry mixture (D) at the upper portion, and, at the lower portion, the blowing machine 4 provided with the feeding mechanism 5 communicating with the receptacle 12, the machine side nozzle 6 continuous to the outlet of the feeding mechanism 5, the hose 7 connecting at its one end to the nozzle 6, and the blowing nozzle 40 at the end portion of the hose 7.

In the embodiment shown in FIG. 6 to FIG. 8, the receptacle 12 has an upper chamber 14a openable by a valve 15 arranged to a chute 13 and a lower chamber 14b, these chambers being laterally provided with main shafts 17a, 17b which are associated by a motor 16 and transmission means such as a sprocket. The lateral main shafts are provided with stirring blade 18 having feed means, by which the thrown material is stirred and mixed, and dropped in succession from the upper chamber 14a to the lower chamber 14b one by one batch. While discharging from the lower chamber 14b to the feed mechanism 5, the material fed into the upper chamber 14a is mixed. Thus such continuous operation is possible.

The feeding mechanism 5 is structured as the screw feeder in the embodiment in FIG. 6 to FIG. 8. Its rear part has a drop hole 20 communicating with the receptacle 12, and its front part is composed of a cylindrical casing 19 defining a taper part 21, a rotary shaft 22 having a screw blade inserted from the rear of the casing 19, and an air motor 23.

For such a feed mechanism 5, the machine side nozzle 6 is provided with a ring 24 surrounding the front portion of the cylindrical casing 19 and a frost-conical taper 26 which reduces cross sectional area toward the end portion from the ring 24 such that a desired ring shape 25 may be defined in relation with the taper 21. The ring 24 is formed with an air supply port 28 for the compression air from a compressor 27 (refer to FIG. 1), and the liquid supply port 8 connecting to a water storage 9 and the pump 29 via the conduit 10. This liquid supply port 8 may be a mere passage or a nozzle.

In the embodiment shown in FIG. 2, FIGS. 9 and 10, the receptacle 12 of the blowing machine 4 is composed as a hopper supported on a supporter 30 and is rotated by a rotary shaft 22. Under the receptacle 12, a rotor 31 is disposed which has a cylindrical pocket 311 on its circumference as the feed mechanism 5, and is sealed at its upper and lower parts with rubber seal plates 32, 33. The rotor 31 is formed at its upper part with a material charging mouth 34 communicating with the hopper 12, and is provided with an air blowing hole 35 at an opposite side to the mouth 34.

For this feed mechanism 5, the machine side nozzle 6 is structured as a cylinder 36 having an elbow shaped curve. The cylinder 36 is inserted therein with a sleeve 37 composed of a curved cylinder portion and a straight cylinder portion in similar shape thereto such that a coaxial space 38 is defined in relation with an inner wall 361 of the cylinder. The sleeve 37 is made of high molecular substance as rubber, and is formed at its upper portion with a flange 371 for engaging a step 362 formed at a top flange 363 of the cylinder 36, and this engagement is secured by a bolt 39. The cylinder 36 is formed with the liquid supply port 8 at its rear side (outer curve portion ) such that a hole center meets the center of the cylinder or is parallel thereto. The liquid supply port 8 is connected to the conduit 10 via the liquid storage 9 and the pump 29, and the conduit 10 is connected to a pipe 411 branched from the air pipe 41 supplying the compression air to the air blowing hole 35. In other words, the liquid supply port 8 serves as the air supply port in this embodiment.

In any of the embodiments, the conduit 10 is provided with an instantaneous flow gauge 42, a valve 43 and a flow valve 11 such as a needle valve. The feed mechanism 5 is furnished with a tachometer 46 via a rotation detecting end 45. The tachometer 46, the flow valve 11 and the gauge 42 are communicated by a controller 49 (converter) having a calculation circuit 47 and an action order circuit 48. The controller 49 is for calculating the amount of discharging the dry-mixed material by the rotation number signal sent from the tachometer 46, counting the amount of adding the liquid from the discharging amount and opening the flow valve 11 at a proper angle, comparing the flow signal fed back from the gauge 42 with the liquid adding amount determined as mentioned above, and regulating the open angle of the flow valve 11 in response to the compared difference. For the controller 49, any structure such as an electric or mechanical system will be sufficient if it has the above mentioned function.

If the hose 7 is coupled with another liquid adder 8', this liquid adder may be a Y shaped coupling metal as shown in FIG. 2, but structures shown in FIG. 11 and FIG. 12 are preferable. That is, this liquid adder 8' is composed of curved attaching plates 50, a pipe 51 which is so inserted as to penetrate in thickness of the plate 50 at determined angle, and means securing the plates 50 on outer circumference of the hose, and the pipe 51 is inserted at its end portion 511 into an oblique hole 71. A plate attaching means is composed of screws 53 screwed into the hose 7 via holes 52 and a band 54 tightening the plates 50.

The pipe or the branch of the Y shaped metal is communicated with a liquid storage 9' through a conduit 10' and is connected with an air pipe 41'. The conduit 10' is provided with an instantaneous flow gauge 42', a valve 43' and a flow control valve 11', and control the open angle of the valve 11' by action order from said controller 49 and scatters the liquid divided with the liquid storage 8 of the machine side nozzle 6 by the compression air, and supplies it.

A further reference will be made to the condition putting the invention into practice. When supplying the aggregate (A), the accelerating agent (B) and the cement (C) from the charging port into the receptacle, closing the upper chamber 14a and the lower chamber 14b, and driving the motor 16 while increasing the pressure up to the determined level, the material (D) is rapidly dry-mixed by the stirring blade 18 disposed on the lateral main shaft 17a, 17b. Subsequently, if equalizing the pressure in the upper chamber 14a and the lower chamber 14b and opening the valve 15, the dry-mixed material (D) is dropped into the lower chamber 14b, and the material is further mixed uniformly there and fed into the feed mechanism 5 in succession. At this time, the upper chamber 14a is charged with the material of the same amount and is effected with the stirring-mixing action.

The dry-mixed material (D) supplied into the feed mechanism 5 is urged by the screw blade owing to driving of the air motor 23 and advanced at constant rate, and is discharged from end portion of the cylindrical casing 19 at the amount corresponding to the rotation number of the screw blade. This rotation number is sent to the controller 49 via the tachometer 46. The feed mechanism 5 is placed at its front range with the ring 24 of the machine side nozzle 6, and since this portion is supplied with the pressure of the determined force and the compression air of the determined flow rate, the dry-mixed material (D) discharged from the cylindrical casing 19 is scattered by the compression air and sent thereon. The ring 24 is introduced with the liquid (W) from the pump 29 and is continuously poured from the liquid pouring port 9. Since the ring shaped space 25 is formed in obliquity due to the taper cylinder 21 of the machine side nozzle 6 and the taper portion of the feed mechanism 5, the poured liquid flows along the inside wall of the tapered cylinder 21. Therefore, no clogging will ever occur at the base portion of the hose 7. The mixture reaches the hose 7 under this condition, and the water film is removed due to decreasing of the flow by the compression air current. The mixture contacts to the dry grains to cause to change the semi-wet to the wet condition. In this duration, the controller 47 is given signals of the rotation number of the rotary shaft 22, and since calculation of rotation number—discharging amount—liquid addition is carried out, and the opening order is given to the flow control valve 11 in response to the calculation so that the exact amount of the liquid addition can be obtained in accord with the aimed water-cement ratio. Thereby and by determination of charge and discharge, the wet-mixed material of the excellent property is jetted from the blowing nozzle 40 to the object. Being the wet mixture, splashing is little and dust hardly occurs.

In the embodiment shown in FIG. 2 and FIGS. 9 and 10, if the rotor 31 is rotated while throwing the dry-mixed material (D) into the hopper (12), the material (D) is charged into the pocket 311 from the charging mouth 34 and the rotor is rotated and the air is blown to a portion where the pocket 311 communicates with the machine side nozzle. The dry-mixed material (D) within the pocket is discharged into the machine side nozzle 6 by this air and fed into the hose. The liquid pouring port 8 of the machine side nozzle is then supplied with secondary compression air fed through the branch 411 and the liquid to be transferred thereon, and those are spouted in circle via the space 38 defined between the inner wall 361 of the cylinder 36 and the sleeve 37. At the same time, the sleeve 37 of hollow condition within the cylinder 36 is pushed. Since the pocket 311 is formed in fixed space within the sleeve 37, the compression air serving to push the material passes intermittently for short cycle. Accordingly, the sleeve 37 is caused with wriggling at the rear curved portion by association of changing in the inner pressure and the outer pressure. Thereby the mixed material is not stayed at the part which will most easily catch the material, and is smoothly got out. This is very advantageous when the aggregate much contains the water or the dry-mixed material contains the reinforcing fibers which easily make fiber balls.

If the liquid adder 8' is prepared as shown in FIG. 11 and FIG. 12, the liquid addition is easily carried out by utilizing the hose as it is, and since this addition is done against the rubber hose and if the part of the material is caught to the hose, it is easily removed by its elasticity and there never occurs a problem in adding foreigners at the intermediate portion of the hose.

EXAMPLE 1

(I) The blowing machine, the feeding machine and the machine side nozzle were used as shown in FIG. 6 to FIG. 8, and the blowing was practised on the slope in accordance with the invention to provide thickness of 15 cm of mortar having the water-cement ratio of 40%.

The receptacle was of volume being 0.33 m³ and air pressure being 6 Kg/cm², and the air motor variable up to 0 to 90 rpm was used for driving the feed mechanism. The hose was 1⅜″ in inner diameter.

(II) Work: 40 Kg cement, 120 Kg sand and 800 g accelerating agent per batch (508 Kg cement, 1650 Kg sand and 10.16 Kg accelerating agent per m³), water in the sand was around 7±1%. Those were thrown into the receptacle and uniformly mixed by the stirring blade. While continuously discharging into the machine side nozzle from the feed mechanism at 4 m³/h, the compression air of 6 Kg/cm² was fed into the machine side nozzle, and the water was simultaneously added to the machine side nozzle at pressure of more than 10 Kg/cm². The amount of the added water was controlled to be 13.5 L/min by the tachometer on the output shaft of the air motor and the controller.

(III) An under Table shows comparison between the dry mixing process adding the water to the same mixture as the above mentioned at the blowing nozzle and the wet mixing process to the same mixture except the accelerating agent in the mixer.

TABLE 1

| Method | A (m) | B | C mg/m³ | D (%) | E Kg/cm²/80 m |
|---|---|---|---|---|---|
| Invention | 140 | Small | 10 | 8 | 3.5 |
| Wet Process | 60 | Small | 8 | 10 | 6.5 |
| Dry Process | 200 | Large | 30 | 18 | 3.0 |

Note:
A = Feed distance
B = Difference in strength
C = Amount of dust
D = Rate of rebound
E = Jet pressure It will be seen from this Table that the mortar of excellent property with little non-uniformity or dispersion could be fed long distance by controlling the splash loss and occurrence of dusts. This is due to the optimum water addition at the machine side nozzle and the transformation of the dry mixture to the wet mixture during transferring in the hose.

EXAMPLE 2

(I) The apparatus was the rotor type as shown in FIG. 9 and FIG. 10 and the concrete was blown on the inner side of the tunnel in accordance with the method in FIG. 2 to provide the lining of the water-cement ratio of 50% and thickness of 100 mm.

The dry-mixed material was, per blowing of 1 m³, the hardening Portland cement of 350 Kg, fine aggregate of 1200 Kg, coarse aggregate of 611 Kg and powder accelerating agent of 17.5 Kg. The fine and coarse aggregates contained 5% water.

The rotor had 9 pockets, and was variable within the range of 8 to 13 rpm by the variable electric motor. The machine side nozzle was 65φ mm in the inner diameter amd was attached with the rubber sleeve similar to this nozzle. The space in relation with the inner wall of the nozzle was 4 mm. The hose was 65φ mm in the inner diameter.

(II) The above mentioned compound was dry-mixed by the continuous mixer. The obtained dry-mixture was thrown into the hopper, and the compression air was supplied 5 Kg/cm² from the air supply port and the water was simultaneously added by pressure of 20 Kg/cm² into the liquid supply port of the machine side nozzle while the compression air of 5 Kg/cm² was fed through the branch pipe. The amount of supplying the water was controlled to be 8.46 to 11.5 L/min within the range of 4 to 6 m³/h by the control circuit of input of the equivalent amount in FIG. 13 and FIG. 14.

(III) An under Table shows comparison between the dry mixing process adding the water to the same mixture at the blowing nozzle and the wet mixing process adding the water in the mixer.

TABLE 2

| Method | A (m) | B | F Kg f/cm² 28 days | D (%) |
|---|---|---|---|---|
| Invention | 140 | Small | 270 | 10 |
| Wet Process | 60 | Small | 275 | 10 |
| Dry Process | 200 | Large | 240 | 25 |

Note:
A = Feed distance
B = Difference in strength
D = Rebound
F = Strength (IV) For the blowing operation, the liquid adder shown in FIG. 11 and FIG. 12 was installed at the position of 20 m from the blowing nozzle. The necessary amount of 80% water was added at the liquid pouring port of the machine side nozzle and the necessary amount of 20% water was added at the liquid adder at pressure of 20 Kg/cm² by the compression air of 5 Kg/cm².

As a result, the feed distance could be made 200 m, and the property of the concrete was the same as in Table 2.

We claim:

1. A method of feeding material, such as mortar or thee like to be blown on compression air, comprising the steps of blowing dry mixture of the material through a feed mechanism of a blowing machine; feeding a predetermined amount of the dry mixture from an outlet nozzle of the feeding mechanism of the blowing machine into a hose adapted to transmit the mixture to a working surface via a blowing nozzle and simultaneously supplying liquid of a predetermined amount bearing on the compression air through said outlet nozzles of the blowing machine so that the material is mixed with the liquid while the material is fed into the hose whereby the mixture is transformed from dry condition to wet condition; controlling grains in the mixed material during feeding it in said hose to thereby provide the desired water-cement ratio, so that the mixed material with the desired cement ratio is formed in said outlet nozzle of the blowing machine, enters the hose, travels through the latter, and is blown from said hose by the blowing nozzle.

2. The method of claim 1, wherein said liquid is water.

3. The method of claim 1, wherein said liquid is water containing water soluble admixture.

4. The method of claim 1, wherein the step of supplying a predetermined amount of liquid is carried out in response to the discharging amount of the dry mixture and the amount of water contained in aggregate at the nozzle of the blowing machine.

5. The method of claim 1, including discharging the dry mixture of a determined amount from the nozzle of the blowing machine, simultaneously supplying a predetermined amount of the liquid at the nozzle of the blowing machine, and supplying the remaining part of the water or the liquid at an intermediate portion of said hose, thereby to moderately transform the mixture from the dry condition to the wet condition of finally aimed water-cement ratio, and blowing it out of the blowing nozzle.

6. The method of claim 1, wherein said dry mixture is a mixture of aggregate and cement.

7. The method of claim 1, wherein said dry mixture is a mixture of aggregate, cement and accelerating agent.

* * * * *